US010122586B2

(12) United States Patent
Htay et al.

(10) Patent No.: US 10,122,586 B2
(45) Date of Patent: Nov. 6, 2018

(54) PHYSICAL ADJACENCY DETECTION SYSTEMS AND METHODS (71) Applicant: Ciena Corporation, Hanover, MD (US)

(72) Inventors: Aung Htay, Alpharetta, GA (US); Mallikarjunappa Kore, Alpharetta, GA (US); Yuan-Ning Weng, Johns Creek, GA (US)

(73) Assignee: Ciena Corporation, Hanover, MD (US)

(*) Notice: Subject to any disclaimer, the term of this patent is extended or adjusted under 35 U.S.C. 154(b) by 143 days.

(21) Appl. No.: 14/880,545

(22) Filed: Oct. 12, 2015

(65) Prior Publication Data
US 2017/0104635 A1 Apr. 13, 2017

(51) Int. Cl.
H04L 12/28 (2006.01)
H04L 12/24 (2006.01)
H04L 12/715 (2013.01)
H04L 12/721 (2013.01)
H04L 12/751 (2013.01)
H04L 12/717 (2013.01)

(52) U.S. Cl.
CPC .............. *H04L 41/12* (2013.01); *H04L 45/02* (2013.01); *H04L 45/42* (2013.01); *H04L 45/64* (2013.01); *H04L 45/70* (2013.01)

(58) Field of Classification Search
None
See application file for complete search history.

(56) References Cited

U.S. PATENT DOCUMENTS

| 5,822,094 | A | 10/1998 | O'Sullivan et al. | |
| 6,594,044 | B1* | 7/2003 | Buchanan | H04Q 11/0005 398/58 |
| 6,687,044 | B2 | 2/2004 | Paquet et al. | |
| 8,352,632 | B2 | 1/2013 | Voight et al. | |
| 8,887,991 | B2 | 11/2014 | Htay et al. | |
| 2002/0191241 | A1 | 12/2002 | Emery et al. | |
| 2004/0008988 | A1* | 1/2004 | Gerstal | H04B 10/032 398/45 |
| 2006/0029391 | A1* | 2/2006 | Yuki | H04J 14/0221 398/45 |
| 2011/0262142 | A1 | 10/2011 | Archambault | |
| 2014/0016926 | A1* | 1/2014 | Soto | H04B 10/0775 398/16 |
| 2014/0126912 | A1 | 5/2014 | Bhatnagar | |
| 2015/0063800 | A1 | 3/2015 | Htay et al. | |
| 2015/0127805 | A1 | 5/2015 | Htay et al. | |
| 2015/0131997 | A1* | 5/2015 | Syed | H04Q 11/0066 398/69 |

* cited by examiner

Primary Examiner — Sithu Ko
(74) Attorney, Agent, or Firm — Clements Bernard Walker PLLC; Christopher L. Bernard; Lawrence A. Baratta, Jr.

(57) ABSTRACT

Adjacency detection systems and methods configured to detect physical interconnection between two devices in a network include communicating data with one or more controllers and data sources associated with the network; for a given port in the network to detect a corresponding port physically connected thereto, causing orchestration of changes in performance monitoring data for the given port over a period of time; and analyzing the data subsequent to the orchestration to detect the corresponding port. The systems and methods can operate over multiple network layers, with different vendor equipment, independent of network protocols, and in-service.

16 Claims, 9 Drawing Sheets

PHYSICAL ADJACENCY DETECTION SYSTEMS AND METHODS

FIELD OF THE DISCLOSURE

The present disclosure generally relates to networking systems and methods. More particularly, the present disclosure relates to physical adjacency detection systems and methods that are multi-vendor, multi-layer, protocol independent, and optionally orchestrated in a Software Defined Networking (SDN) environment.

BACKGROUND OF THE DISCLOSURE

As networks continue to grow, physical adjacency detection becomes more complex. As described herein, physical adjacency detection refers to determining which ports on which network elements, switches, nodes, etc. are connected to one another, i.e., adjacency is interconnection. Various conventional techniques for adjacency detection exist. In Time Division Multiplexing (TDM) protocols such as Synchronous Optical Network (SONET), Synchronous Digital Hierarchy (SDH), and Optical Transport Network (OTN) can have overhead such as the Trail Trace Indicator (TTI) field which detects adjacency. In Layer 2, the Link Layer Discovery Protocol (LLDP) is used by network devices for advertising their identity, capabilities, and neighbors on an IEEE 802 local area network, principally wired Ethernet. Additionally, various proprietary vendor solutions exist as well. For example, Ciena Corporation has implemented Service and Photonic Layer Interoperability (SPLI) on line side optics for adjacency detection and other functionality. Other approaches include using dither to modulate waveform depth on optics, using acoustic signals in addition to optical signals, and the like. All of these aforementioned techniques have similar limitations. Specifically, each of the above is either dedicated to a single layer (Layer 1 as in TTI, Layer 2 as in LLDP, etc.) or is proprietary to a single vendor (e.g., dither, acoustic, etc.). Another solution is to turn connections (lasers) on and off to detect adjacency. Of course, this approach affects traffic and is not in-service. Since practical network deployments are multi-layer and multi-vendor, there exists a need for physical adjacency detection systems and methods to operate in such deployments.

BRIEF SUMMARY OF THE DISCLOSURE

In an exemplary embodiment, an adjacency detection method configured to detect physical interconnection between two devices in a network includes communicating data with one or more controllers and data sources associated with the network; for a given port in the network to detect a corresponding port physically connected thereto, causing orchestration of changes in performance monitoring data for the given port over a period of time; and analyzing the data subsequent to the orchestration to detect the corresponding port. The adjacency detection method can further include updating a topology of the network based on the orchestration. The adjacency detection method can further include verifying the corresponding port is connected to the given port by causing a second orchestration of changes in performance monitoring data for the corresponding port and analyzing the data subsequent to the second orchestration from the corresponding port. The changes in performance monitoring data can include modifying transmit power of the given port over the period of time with a unique fingerprint. The analyzing can include determining which port in the network exhibits PM data for receiving a signal similar to the unique fingerprint. The adjacency detection method can further include analyzing historical performance monitoring data and equipment specifications in the network to determine the changes in performance monitoring data. The changes in performance monitoring data can be performed in-service on the given port and within ranges ensuring no traffic is disrupted. The one or more controllers can include at least one Software Defined Networking (SDN) controller. The network can include one or more layers and one or more different vendors for network elements included therein, and wherein the causing and analyzing is performed by a higher-layer application thereby being vendor independent and layer independent.

In another exemplary embodiment, an adjacency detection system configured to detect physical interconnection between two devices in a network includes a network interface communicatively coupled with one or more controllers and data sources associated with the network; a processor communicatively coupled to the network interface; and memory storing instructions that, when executed, cause the processor to communicate data with the one or more controllers and data sources, for a given port in the network to detect a corresponding port physically connected thereto, cause orchestration of changes in performance monitoring data for the given port over a period of time, and analyze the data subsequent to the orchestration to detect the corresponding port. The memory storing instructions that, when executed, can further cause the processor to update a topology of the network based on the orchestration. The memory storing instructions that, when executed, can further cause the processor to verify the corresponding port is connected to the given port by causing a second orchestration of changes in performance monitoring data for the corresponding port and analyzing the data subsequent to the second orchestration from the corresponding port. The changes in performance monitoring data can include a modification of transmit power of the given port over the period of time with a unique fingerprint. The memory storing instructions that, when executed, can further cause the processor to determine which port in the network exhibits PM data for receiving a signal similar to the unique fingerprint. The memory storing instructions that, when executed, can further cause the processor to analyze historical performance monitoring data and equipment specifications in the network to determine the changes in performance monitoring data. The changes in performance monitoring data can be performed in-service on the given port and within ranges ensuring no traffic is disrupted. The one or more controllers can include at least one Software Defined Networking (SDN) controller. The network can include one or more layers and one or more different vendors for network elements included therein, and wherein the orchestration is performed by a higher-layer application thereby being vendor independent and layer independent. The adjacency detection system can be a Software Defined Networking (SDN) application.

In a further exemplary embodiment, a multi-layer network includes a plurality of network elements interconnected to one another at a plurality of layers; one or more controllers communicatively coupled to the plurality of network elements; and a server communicatively coupled to the one or more controllers, wherein the server is configured to communicate data with the one or more controllers and data sources, for a given port in the network to detect a corresponding port physically connected thereto, cause orchestration of changes in performance monitoring data for the given port over a period of time, and analyze the data subsequent to the orchestration to detect the corresponding port.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, physical adjacency/interconnection detection systems and methods are described that are multi-vendor, multi-layer, protocol independent, in-service (not traffic affecting), and optionally orchestrated in a Software Defined Networking (SDN) environment. Specifically, the systems and methods can discover interconnection between nodes, network elements, modules, ports, etc. at one or more layers, from a same or different vendors, in-service without affecting traffic. The systems and methods provide multi-vendor, multi-layer, and in-service adjacency detection. Stated differently, the systems and methods are vendor, layer, and protocol independent. Further, the systems and methods can operate with any equipment without additional hardware or without modifications to the existing equipment. The systems and methods rely on a higher-layer application (e.g., SDN, etc.) to interface with the existing equipment (e.g., via Application Programming Interfaces (APIs), network management interfaces, etc.) to orchestrate changes and to detect the changes in other equipment which is then determined to be interconnected.

The automatic discovery of interconnection between nodes/modules/ports is achieved by orchestrating and analyzing the performance monitoring (PM) parameters. In operation, the systems and methods orchestrate performance monitoring parameters (e.g., power levels, etc.) to transmit a unique fingerprint of an equipment asset. The unique fingerprint is simultaneously orchestrated in two-dimensional space (both PM and a monitoring period). Subsequently, the systems and methods perform a unidirectional match and ascertain the match by the reverse process of the unique fingerprint of the receiving equipment asset. Advantageously, because the systems and methods operate by orchestrating and analyzing physical power, the systems and methods work at any layer, on any equipment, in-service. Also, the systems and methods can perform data analytics on the historical PM and equipment specifications to optimally select the transmit power levels to represent the framing (when to start detection), the zero (data bit), and the one (data bit), to both ensure in-service operation and to select possible matches. The systems and methods can be implemented in an SDN application, SDN controller, a Network Management System (NMS), or the like.

SDN Network

Figure 1:
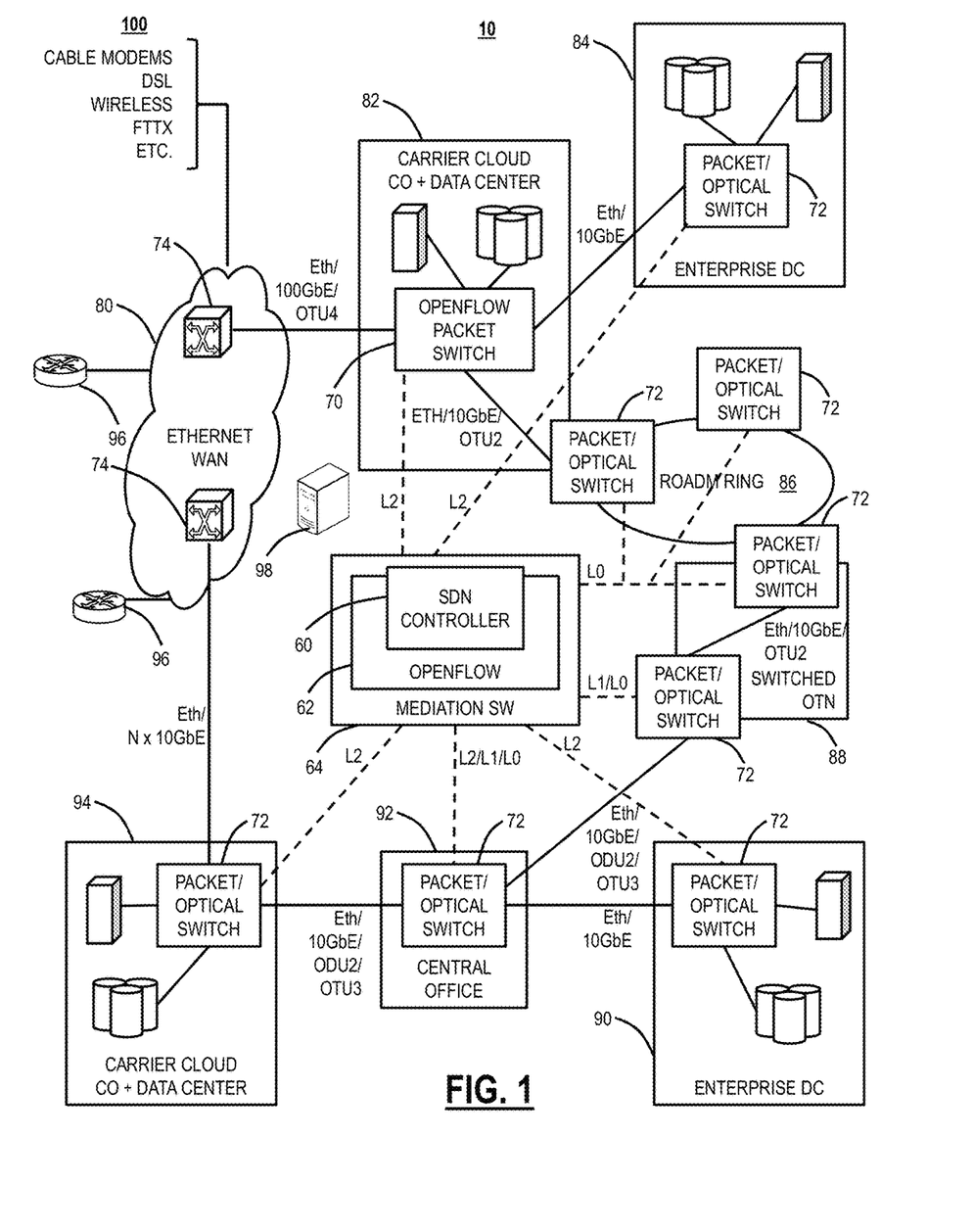
FIG. 1 is a network diagram of an exemplary network for describing the systems and methods.

Referring to FIG. 1, in an exemplary embodiment, a network diagram illustrates an exemplary network 10 for describing the systems and methods. Those of ordinary skill in the art will recognize that any network configuration, such as at Layers 0, 1, 2, and/or 3, is contemplated with the systems and methods, and the network 10 is merely presented for illustration. The network 10 is an SDN network, which includes an SDN controller 60 with the ability to (logically) centrally program provisioning of forwarding in the network 10 in order for more flexible and precise control over network resources to support new services. Application Programmable Interfaces (APIs) provide programmatic communication between an SDN controller and either (i) specific applications or (ii) programmable network devices such as communication over Transaction Language-1 (TL-1) or Common Object Request Broker Architecture (CORBA) calls. OpenFlow (www.openflow.org) is an example implementation of a special OpenFlow interface 62 from the SDN controller 60 to programmable network devices. It may or may not communicate via mediation software 64, to each switch 70, 72, 74 in the network 10 in order to provision the forwarding table at each switch along a connection path in order to instantiate the forwarding behavior needed for the connection. OpenFlow is described, for example, in the OpenFlow Switch Speciation, Version 1.1.0 (February 2011)—Version 1.3.0 (June 2012), the contents of which are incorporated by reference herein. While OpenFlow describes one version of an SDN interface, other SDN protocols besides OpenFlow (such as Netflow, REST, etc.) are also contemplated with the systems and methods described herein.

Again, for illustration purposes, the network 10 includes an OpenFlow-controlled packet switch 70, various packet/optical switches 72, and packet switches 74 with the switches 70, 72 each communicatively coupled to the SDN controller 60 via the OpenFlow interface 62 and the mediation software 64 at any of Layers 0-3 (L0 being DWDM, L1 being OTN, and L2 being Ethernet). The switches 70, 72, 74, again for illustration purposes only, are located at various sites, including an Ethernet Wide Area Network (WAN) 80, a carrier cloud Central Office (CO) and data center 82, an enterprise data center 84, a Reconfigurable Optical Add/Drop Multiplexer (ROADM) ring 86, a switched OTN site 88, another enterprise data center 90, a central office 92, and another carrier cloud Central Office (CO) and data center 94. The network 10 can also include IP routers 96 and a network management system (NMS) 98. Note, there can be more than one of the NMS 98, e.g., an NMS for each type of equipment—communicatively coupled to the SDN controller 60. Again, the network 10 is shown just to provide context and typical configurations at Layers 0-3 in an SDN network for illustration purposes. Those of ordinary skill in the art will recognize various other network configurations are possible at Layers 0-3 in the SDN network.

The switches 70, 72, 74 can operate, via SDN, at Layers 0-3. The OpenFlow packet switch 70, for example, can be a large-scale Layer 2 Ethernet switch that operates, via the SDN controller 60, at Layer 2 (L2). The packet/optical switches 72 can operate at any of Layers 0-3 in combination. At Layer 0, the packet/optical switches 72 can provide wavelength connectivity such as via DWDM, ROADMs, etc., at Layer 1, the packet/optical switches 72 can provide time division multiplexing (TDM) layer connectivity such as via Optical Transport Network (OTN), Synchronous Optical Network (SONET), Synchronous Digital Hierarchy (SDH), etc., at Layer 2, the packet/optical switches 72 can provide Ethernet or Multi-Protocol Label Switching (MPLS) packet switching and at Layer 3 the packet/optical switches can provide IP packet forwarding. The packet switches 74 can be traditional Ethernet switches that are not controlled by the SDN controller 60. The network 10 can include various end user access technologies 100, such as, without limitation, cable modems, digital subscriber loop (DSL), wireless, fiber-to-the-X (e.g., home, premises, curb, etc.), and the like. In an exemplary embodiment, the network 10 is a multi-vendor (i.e., different vendors for the various components) and multi-layer network (i.e., Layers L0-L3).

Figure 2:
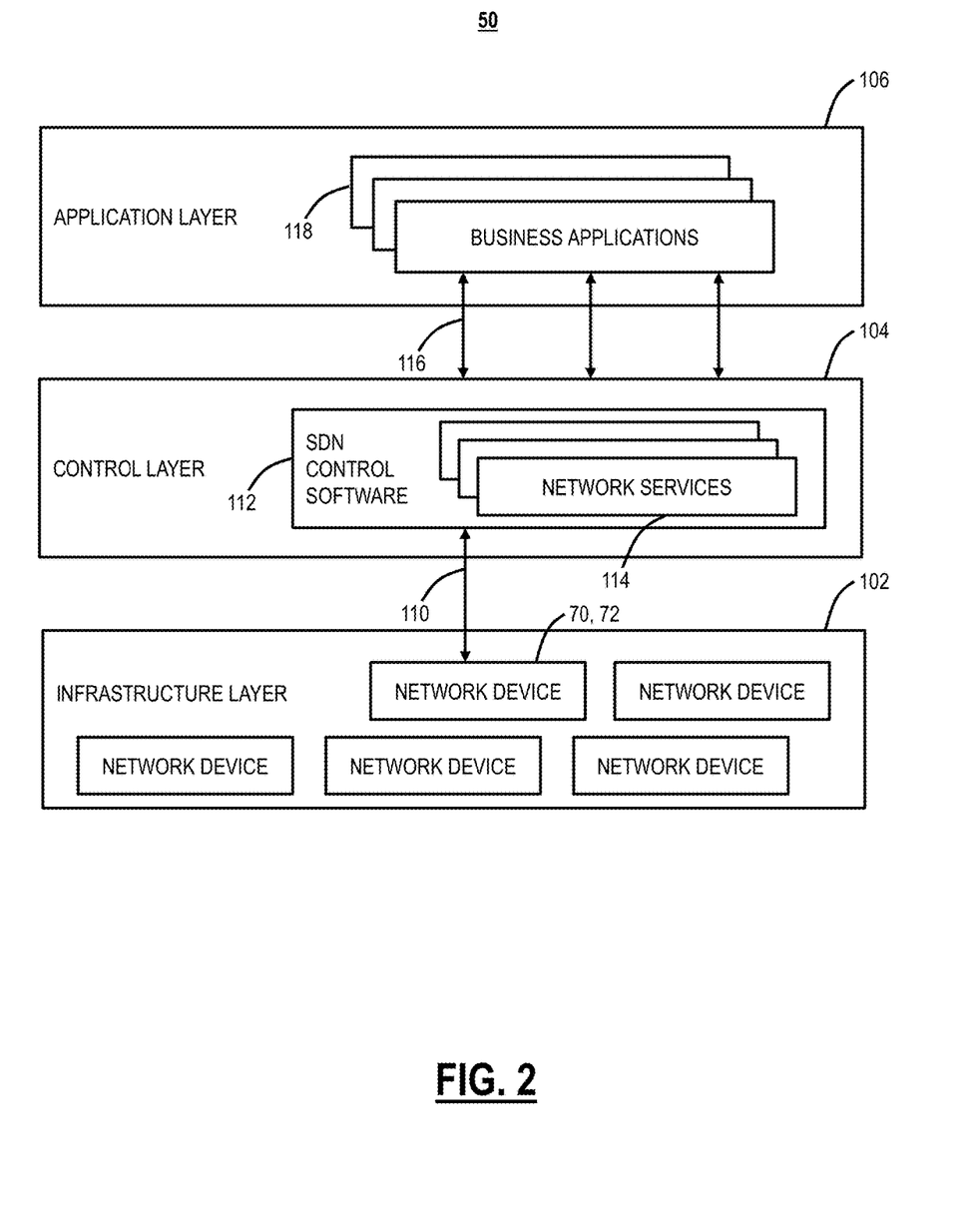
FIG. 2 is a block diagram of functional components of an SDN environment.
Figure 3:
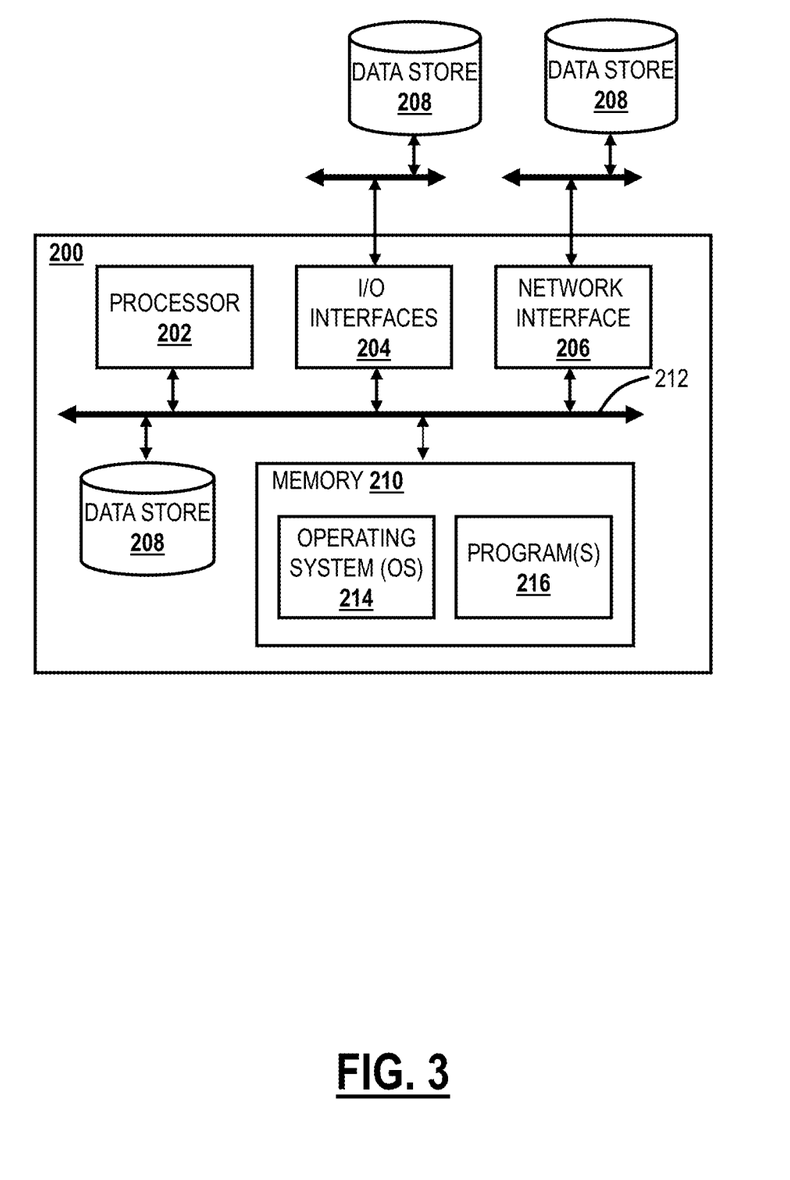
FIG. 3 is a block diagram of a server which may be used to realize the SDN controller in FIG. 1, the business applications in FIG. 2, and/or other systems.

Referring to FIG. 2, in an exemplary embodiment, a block diagram illustrates functional components of an SDN environment 50. The SDN environment 50 layers 104, 106 can be implemented on one or more servers, such as illustrated in FIG. 3 and the layers 104, 106 can be through functional components implemented in software executed on the server. The SDN environment 50 includes a programmable infrastructure layer 102, a control layer 104, and an application layer 106. The programmable infrastructure layer 102 includes network devices such as the switches 70, 72 and the like. The programmable infrastructure layer 102 is communicatively coupled to the control layer 104 via a control plane interface 110 such as OpenFlow, for example. The control layer 104 facilitates communication between the application layer 106 and the network devices 70, 72 located in programmable infrastructure layer 102. The control layer 104 includes SDN control software 112 with a plurality of network services 114. The control layer 104 provides SDN functionality to manage network services through abstraction of lower level functionality. The application layer 106 communicates with the control layer 104 through various Application Programming Interfaces (APIs) 116. The application layer 106 provides end user connectivity to the SDN such as software modules and/or functions responsible for creating the desired path and flow connections on the physical network through various business applications 118. In an exemplary embodiment, the systems and methods described herein are implemented as one of the business applications 118 on the SDN controller 60 and/or on a separate server 200.

Exemplary Server

Referring to FIG. 3, in an exemplary embodiment, a block diagram illustrates a server 200 which may be used to realize the SDN controller 60, the business applications 118, and/or other systems. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and practical embodiments may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touchpad, and/or a mouse. The system output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate over a network, such as the Internet, a wide area network (WAN), a local area network (LAN), and the like, etc. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

In an exemplary embodiment, the server 200 can be an adjacency detection system configured to detect physical interconnection between two devices in a network. Again, the server 200 includes the network interface 206 communicatively coupled with one or more controllers and data sources associated with the network; the processor 202 communicatively coupled to the network interface 206; and the memory 210 storing instructions that, when executed, cause the processor to communicate data with the one or more controllers and data sources, for a given port in the network to detect a corresponding port physically connected thereto, cause orchestration of changes in performance monitoring data for the given port over a period of time, and analyze the data subsequent to the orchestration to detect the corresponding port. The memory 210 storing instructions that, when executed, can further cause the processor to update a topology of the network based on the orchestration. The memory 210 storing instructions that, when executed, can further cause the processor to verify the corresponding port is connected to the given port by causing a second orchestration of changes in performance monitoring data for the corresponding port and analyzing the data subsequent to the second orchestration from the corresponding port.

The changes in performance monitoring data can include a modification of transmit power of the given port over the period of time with a unique fingerprint. The memory 210 storing instructions that, when executed, can further cause the processor to determine which port in the network exhibits PM data for receiving a signal similar to the unique fingerprint. The memory 210 storing instructions that, when executed, can further cause the processor to analyze historical performance monitoring data and equipment specifications in the network to determine the changes in performance monitoring data. The changes in performance monitoring data can be performed in-service on the given port and within ranges ensuring no traffic is disrupted. The one or more controllers can include at least one Software Defined Networking (SDN) controller. The network can include one or more layers and one or more different vendors for network elements included therein, and wherein the orchestration is performed by a higher-layer application thereby being vendor independent and layer independent. The adjacency detection system can be a Software Defined Networking (SDN) application.

Adjacency Detection System

Figure 4:
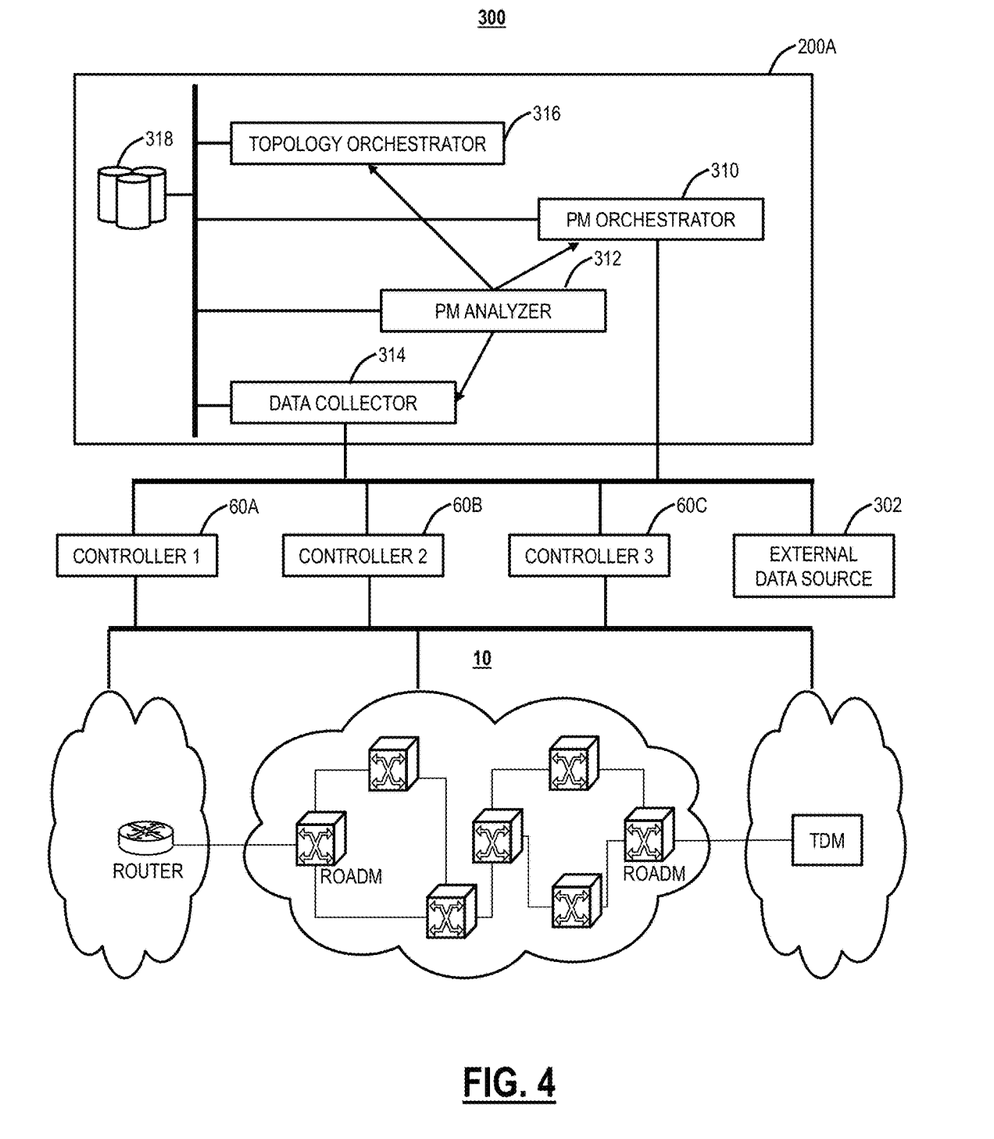
FIG. 4 is a network diagram of an adjacency detection system configured to detect physical interconnection between two devices in a network.

Referring to FIG. 4, in an exemplary embodiment, a network diagram illustrates an adjacency detection system 300 configured to detect physical interconnection between two devices in a network. The adjacency detection system 300 is illustrated with various functional components which can be realized in the SDN controller 60, the SDN environment 50, one or more of the servers 200, or the like. In an exemplary embodiment, the adjacency detection system 300 is configured to operate with the network 10; although other networks are also contemplated.

The adjacency detection system 300 includes a one or more controllers 60A, 60B, 60C, external data sources 302, and an application server 200A. The controllers 60A, 60B, 60C, are communicatively coupled to the network 10 and can include other components such as network element adaptors and the like. The application server 200A can be an SDN application server executing one or more applications 310, 312, 314, 316 and in communication with scalable data storage 318. The applications 310, 312, 314, 316 can be business applications 118 described in the SDN environment 50. The applications 310, 312, 314, 316 include a PM orchestrator 310, a PM analyzer 312, a data collector 314, and a topology orchestrator 316. Collectively, the applications 310, 312, 314, 316 can run on top of the scalable data storage 318 and a data processing backend.

The data collector 314 is configured to communicate southbound with the controllers 60A, 60B, 60C, and the controllers 60A, 60B, 60C are configured to manage the multi-vendor and multi-layer network 10. Additionally, the data collector 314 can get data from the external data sources 302, such as vendor equipment specifications, historical PM and existing inventory systems, and the like. The collected information, from the controllers 60A, 60B, 60C and the external data sources 302, can be transformed into a common data model and stored in the scalable data storage 318. Collectively, data from the controllers 60A, 60B, 60C and the external data sources 302 can be referred to as data sources for the adjacency detection system 300.

The data collector 314 retrieves the equipment asset, equipment specification, topology link information, and PM data from the data sources including the network 10 and external data sources 302. The data collector 314 can persist the data in the scalable data storage 318.

The PM orchestrator 310 is communicatively coupled to the controllers 60A, 60B, 60C. The PM orchestrator 310 is configured to orchestrate or cause changes to PM data for a given port over a period of time. Here, the objective is to determine where the given port is connected to the network 10. The PM orchestrator 310 is also communicatively coupled to the PM analyzer 312, and the PM orchestrator 310 is configured to provide details of the orchestrated changes on the given port to the PM analyzer 312. The orchestrated changes can be a unique fingerprint that can be detected on a corresponding port by the PM analyzer 312. Note, in an exemplary embodiment, the orchestrated changes to the PM data can be varying power levels for the given port within a range and with a specific pattern over the period of time. The range can be within specifications of the given port to ensure the detection is performed in-service. The specific pattern can be identifiable in the PM data at a corresponding port connected to the given port.

The PM analyzer 312 is communicatively coupled to the data collector 314. The PM analyzer 312 is configured to review PM data from the data collector to detect the corresponding port connected to the given port, in view of the details of the orchestrated changes on the given. That is, the corresponding port is detected by analyzing the PM data to find the orchestrated changes in the one or more PMs for the given port. That is, the PM analyzer 312 reviews data from the data sources to detect the corresponding port connected to the given port. The PM analyzer 312 is configured to determine the corresponding port The topology orchestrator 316 is communicatively coupled to the PM analyzer 312. The topology orchestrator 316 receives data related to the corresponding port connected to the given port to update or "stitch" the topology of the network 10 together.

Adjacency Detection Process

Figure 5:
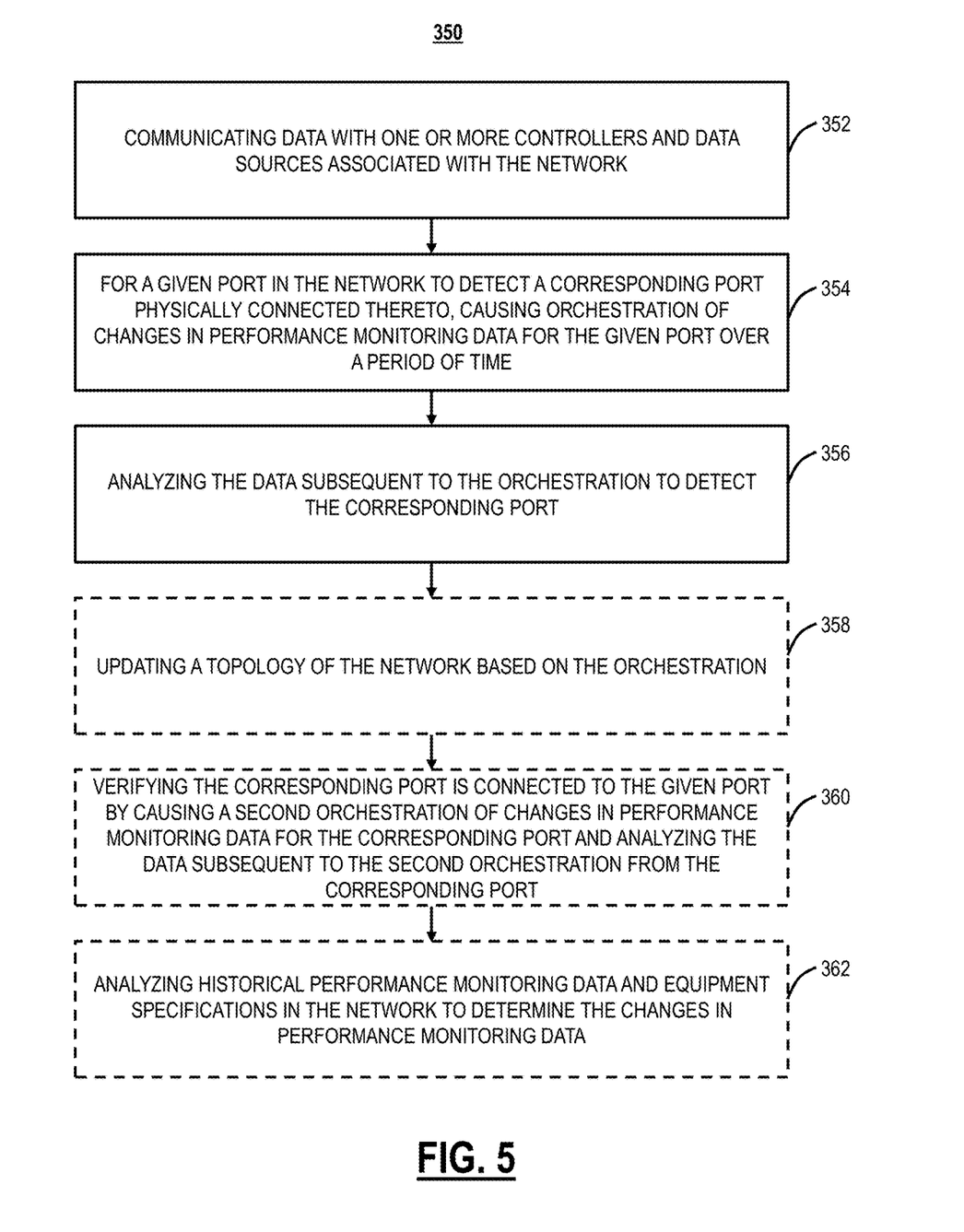
FIG. 5 is a flowchart of an adjacency detection process configured to detect physical interconnection between two devices in a network.

Referring to FIG. 5, in an exemplary embodiment, a flowchart illustrates an adjacency detection process 350 configured to detect physical interconnection between two devices in a network. The adjacency detection process 350 can be implemented through the adjacency detection system 300. The adjacency detection process 350 includes communicating data with one or more controllers and data sources associated with the network (step 352); for a given port in the network to detect a corresponding port physically connected thereto, causing orchestration of changes in performance monitoring data for the given port over a period of time (step 354); and analyzing the data subsequent to the orchestration to detect the corresponding port (step 356). The adjacency detection process 350 can further include updating a topology of the network based on the orchestration (step 358). The adjacency detection process 350 can further include verifying the corresponding port is connected to the given port by causing a second orchestration of changes in performance monitoring data for the corresponding port and analyzing the data subsequent to the second orchestration from the corresponding port (step 360).

The adjacency detection process 350 can further include analyzing historical performance monitoring data and equipment specifications in the network to determine the changes in performance monitoring data (step 362). The changes in performance monitoring data can include modifying transmit power of the given port over the period of time with a unique fingerprint. Step 356 can include determining which port in the network exhibits PM data for receiving a signal similar to the unique fingerprint. The changes in performance monitoring data can be performed in-service on the given port and within ranges ensuring no traffic is disrupted. The one or more controllers can include at least one Software Defined Networking (SDN) controller. The network can include one or more layers and one or more different vendors for network elements included therein, and wherein steps 354, 356 can be performed by a higher-layer application thereby being vendor independent and layer independent.

PM Orchestrator

In an exemplary embodiment, the PM orchestrator 310 is configured to perform various steps. Each of equipment asset (port, line module, node, network element, pluggable transceiver, etc.) in the network 10 can be given a unique fingerprint by utilizing attributes including, but not limited to, a Common Language Location Identifier (CLLI), a Common Language Equipment Identification (CLEI), a Target Identification (TID), an Access Identifier (AID), a vendor identifier, a Product Engineering Code (PEC), a Serial Number (SN), and the like. In an exemplary embodiment, the set of attributes can be processed with a Secure Hash Algorithm (e.g., SHA-1) to produce a message digest, e.g., a 160-bit message digest. For example, a port on a specific module can have the following data:

| | |
|---|---|
| CLLI | ATLNGANW--- |
| Vendor | Ciena |
| TID | ATL1 |
| AID | P10GEL-10-8-1 |
| PEC | NTK530QA |
| CLEI | |

The associated message digest (in hexadecimal) is 9b0ff92d74bc8ab23ad3f75ba27cc81401ca43da. Note, the CLLI is a physical location identifier, the Vendor identifies the end manufacturer of the module, the TID and AID are unique port identifiers, and the PEC is the Vendor's specific identifier for the type of module. Because of the nature of SHA, even the next port on the same module or card will give a widely different digest. For example, a different port on the same module as above can have the following data:

| | |
|---|---|
| CLLI | ATLNGANW--- |
| Vendor | Ciena |
| TID | ATL1 |
| AID | P10GEL-10-8-2 |
| PEC | NTK530QA |
| CLEI | |

The associated message digest (in hexadecimal) is e7cc8fb8564a6b431a168cfe4079e94702fb52ee. Note, all of the data is the same except the AID, because these ports are on the same module.

Variously, the message digest for each port can be a unique fingerprint to identify the port in the network. The unique fingerprints can be given an alias. Each alias is the least number of bits from the unique fingerprint that is unique across the data set. It is expected that most of the alias will be 32 bits or less out of the 160 bits.

For example, the following table illustrates some unique fingerprints of assets and associated alias.

| Example unique fingerprint | Alias |
|---|---|
| a48cb2b71b4d71ed6e9cf7110f43062474a2b5b3 | a4 |
| a61bae33f8526bad712ac2fbe4308899aaa64197 | a61 |
| a67a464398a4818e8179aa9e46bba4e6e74a363a | a67 |
| a6e92716bb3291be3889eaaae2ac034a38419da6 | a6e |
| a80d9aa8323723d37b756f0cfb529a7bacea13bb | a80 |
| a851b67873c209edba680f01f05675851cadc7c5 | a85 |
| a94ce8c8e742144b24aa384481d3225d71f721eb | a94 |
| a9ec3f6f93d13ee4c6196fc126190f773ff15c6d | a9e |
| aa696f86dd2d4107b9d992d398f666344b1f46ba | aa6 |
| aa76baa56ce9935e623081b1927b78d7b8703246 | aa7 |

Note,
this is done once initially and additionally any time new equipment assets are collected.

Equipment assets are analyzed for potential adjacency pairs, using data including, but not limited to, CLLI, CLEI, and historical PM data.

Figure 6:
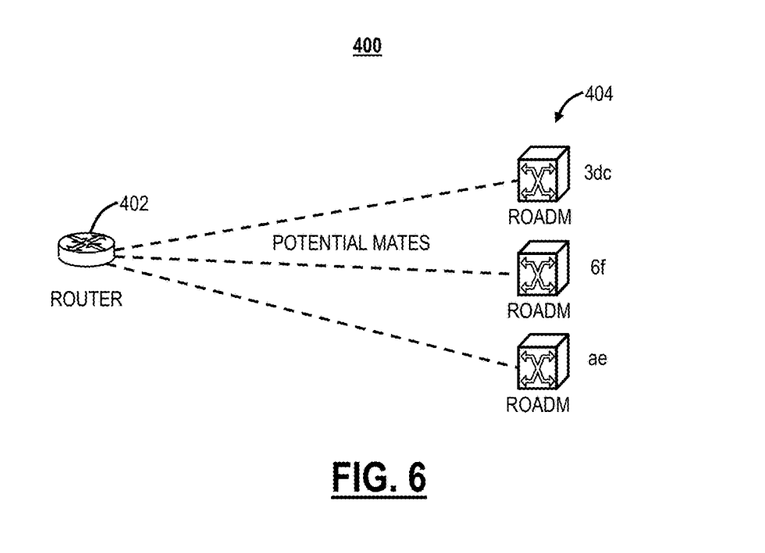
FIG. 6 is a network diagram of a use case where the adjacency detection process is used on a port on a router.

Referring to FIG. 6, in an exemplary embodiment, a network diagram illustrates a use case 400 where the adjacency detection process 350 is used on a port on a router 402. In the use case 400, the router 402 include a pluggable transceiver with a programmable VOA, i.e., an equipment asset to be manipulated. The PM orchestrator 310 picks the equipment asset to be manipulated and potential mates 404. In the use case, the equipment asset to be manipulated has a unique fingerprint of 020184f681ff76fded3bcca5b3c533574ce8842a with an of 020. The potential mates 404, for example, have associated alias of 3dc, 6f, ae. Note, the potential mates 404 can be all or a subset of the other equipment assets in the network. The potential mates 404 can be filtered based on location, historical PM analysis, and the like. That is, if the equipment asset to be manipulated in a short-reach pluggable transceiver for intra-office connectivity, then equipment assets at other locations can be ignored.

The PM orchestrator 310 informs the PM analyzer 312 of the following information, for example, in the use case 400:

| Item | Value(s) |
|---|---|
| Equipment asset to be manipulated | alias 020 |
| Potential mates | 3dc, 6f, ae |
| Historical PM data for the equipment assets | Associated values |
| Start time of Orchestration | T |
| Sample period | t |
| Natural Period | 18 x t |
| Orchestrated Period | 18 x t |
| Total samples | 12 18 x t |

The historical PM data for each equipment asset can include historical natural TX/RX variation, TX/RX power thresholds, accuracy and sensitivity, and the like. The historical PM data can be used so that the optimal framing, zero, and one power levels can be orchestrated and detected in the adjacency detection process 350, as well as to ensure traffic is not affected. The framing is used to determine when to start detection while the zero and one power levels are used for data.

Figure 7:
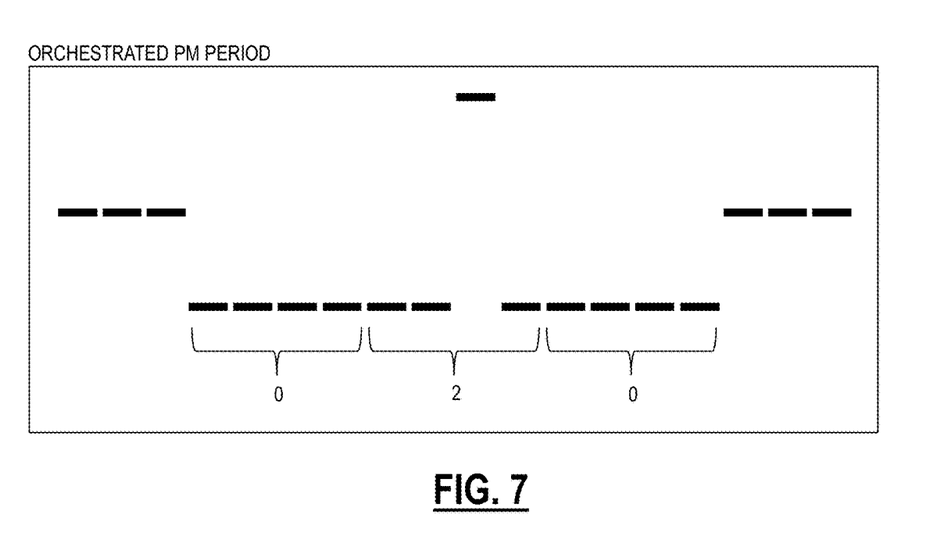
FIG. 7 is a graph of an orchestrated PM period where a specific bit pattern of 020 by changing TX power levels.

At the start time T, the PM orchestrator 310 manipulates the transmit power of the equipment asset (alias 020) to send the bit patterns of the alias shown in FIG. 7. Specifically, FIG. 7 is a graph of an orchestrated PM period where a bit pattern of 020 is sent by changing TX power levels of the equipment asset with alias 020. The equipment asset with alias 020=(0000 0010 0000) has its TX power orchestrated (e.g., via the programmable VOA) to send the bits associated with the alias. The power monitor accuracy and receiver sensitivity are taken into account, when selecting the framing, zero, and one power levels. The received power is monitored at the potential mates 404.

Figure 8:
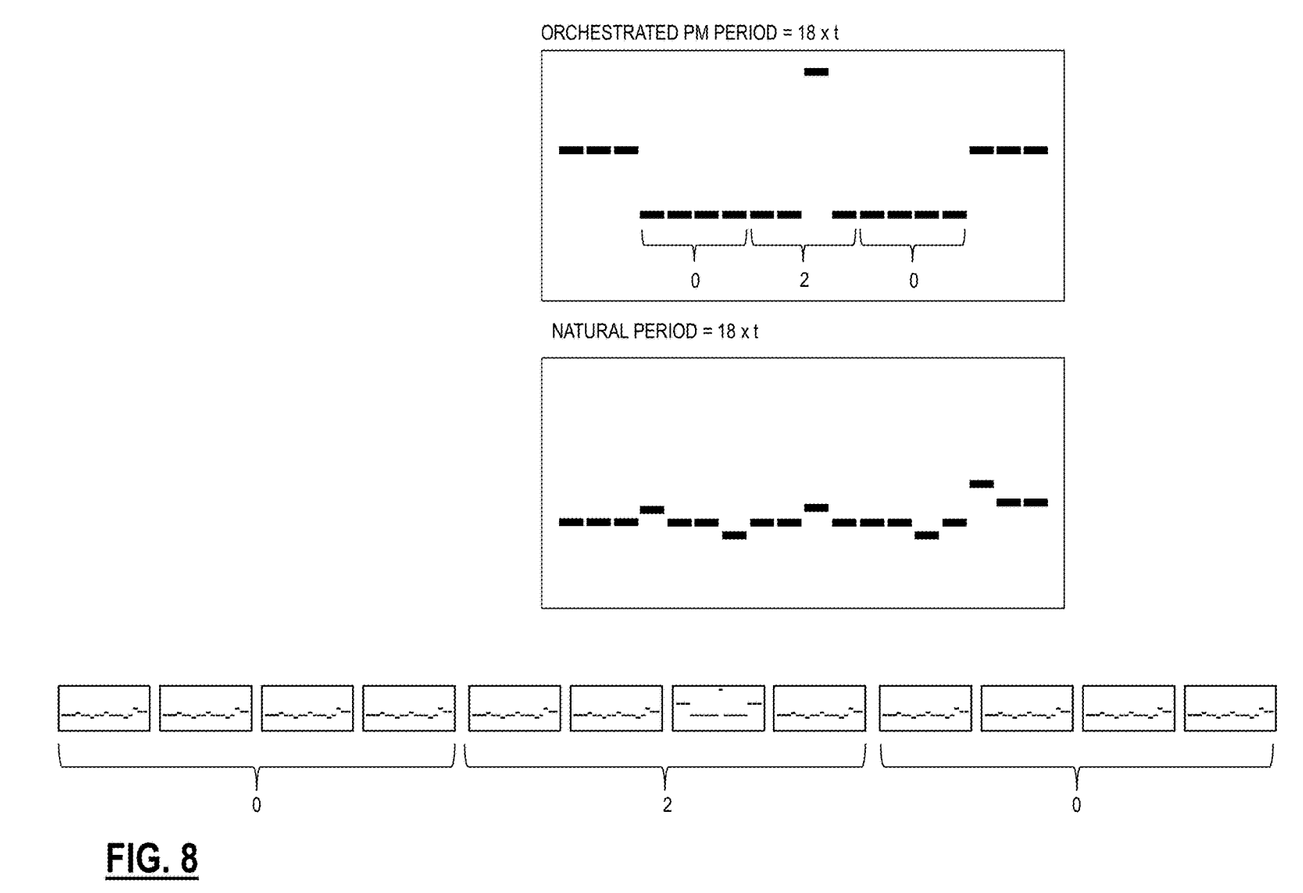
FIG. 8 is a graph of an orchestrated PM period with a specific bit pattern of 020, a natural period with random power levels, and a two-dimensional bit pattern transmission.

Referring to FIG. 8, in an exemplary embodiment, a graph illustrates an orchestrated PM period with a bit pattern of 020, a natural period with random power levels, and a two-dimensional bit pattern transmission. The PM orchestrator 310 can use a two-dimensional bit pattern transmission, as shown in FIG. 8. The PM orchestrator 310 needs to send alias 020, the orchestration period is 18×t (including marker bits at the start and end). The natural (N) period (without orchestration) is used as zero and orchestrated (O) period is used as 1 (see FIG. 8), so the alias is encoded as {N N N N N N O N N N N N}.

PM Analyzer

The PM analyzer 312 is configured to instruct the data collector 314 to perform periodic (t) PM collection for the equipment assets 020 (TX), 3dc (RX), 6f (RX), ae (RX) to start at T and collect 12×18×t periods. The PM analyzer 312 monitors the received power at the potential mates 404 and recovers the bit pattern using historical natural TX/RX variation, TX/RX power thresholds, accuracy, and sensitivity. If the bit pattern at the one of the potential mates 404 matches the transmit pattern, then there is a potential hit (for example, alias ae). The match can be double checked through the second dimension of N N N N N N O N N N N N as shown in FIG. 8.

The PM analyzer 312 informs the PM orchestrator 310 of the potential match. The PM orchestrator 310 can then reverses the process and orchestrate from the identified potential mate to transmits the pattern ae (1010 1110). The PM analyzer 312 can then confirm that alias 020 is receiving the pattern and both alias 020 and alias ae are "connected." The information is sent to the topology orchestrator 316 to stitch the pair.

Note, the aforementioned description of message digests, unique fingerprints, and alias is just one exemplary technique to identify uniquely and detect equipment assets. Those of ordinary skill in the art will recognize other approaches are also contemplated, namely any identifier that can be changed in the PM data by the PM orchestrator 310 such that the PM analyzer 312 can uniquely detect the corresponding port in the network.

Exemplary Implementation

Figure 9:
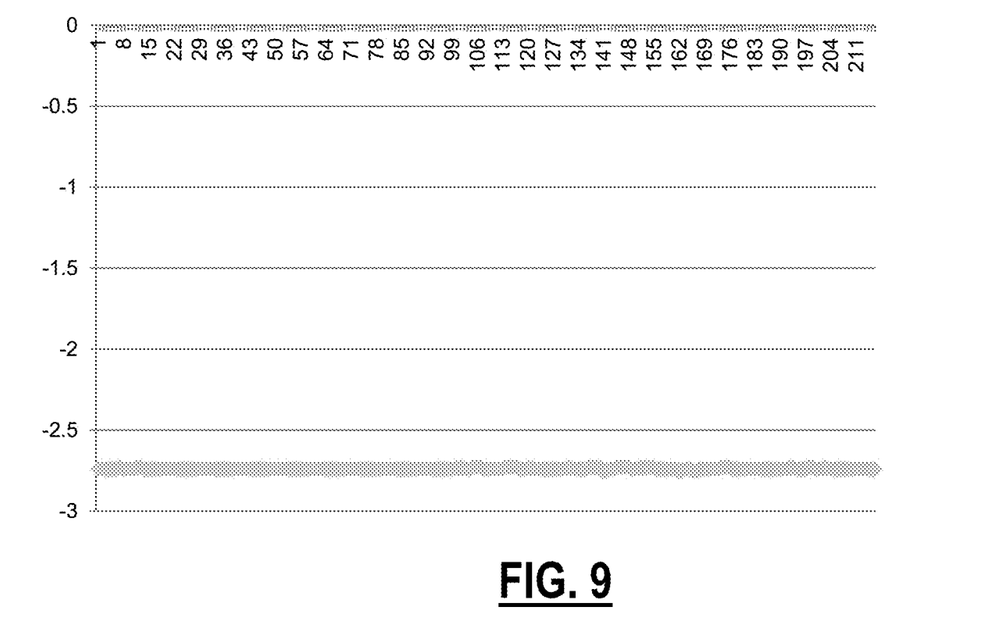
FIGS. 9-12 are graphs of power over time, for an exemplary implementation of the adjacency detection process of FIG. 5.
Figure 10:
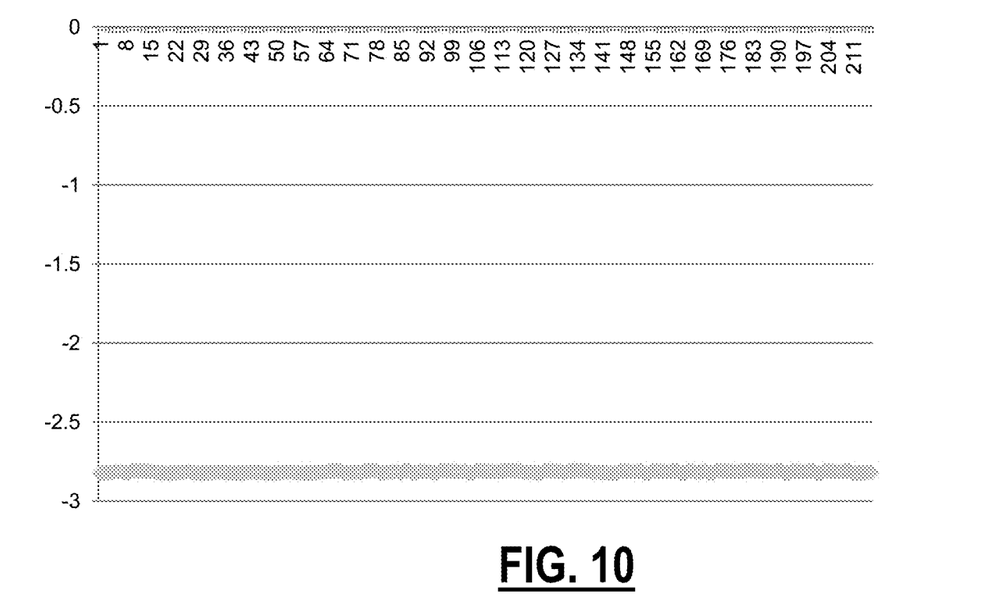

The systems and methods were tested with various off-the-shelf SFP modules with VOAs in Cisco, Ciena, Juniper, and Alcatel-Lucent switches. Referring to FIGS. 9-12, in various exemplary embodiments, graphs illustrate power over time, for an exemplary implementation of the adjacency detection process 350. FIG. 9 is a graph of TX power of an equipment asset over 216 periods, for example. Note, the natural variation of the TX power is about +0.02 to −0.02 dBm. FIG. 10 is a graph of RX power of a corresponding equipment asset over 216 periods, for example. The natural variation of the RX power is +0.02 to −0.01 dBm. Now, the transceiver in this exemplary implementation can have the following specifications:

| Wavelength | Data Rate | Average TX Output Power | Average RX Power Range |
|---|---|---|---|
| 850 nm | 10.3125 Gb/s | −1 dBm to −7.3 dBm | −1 dBm to −9.9 dBm |

Knowing the specifications above, for example, the adjacency detection process 350 can use −1.5 dBm (as the bit 1), −2.0 dBm (as the framing), and −2.5 dBm (as the bit 0). This allows the PM analyzer 312 to distinguish between natural variations (0.02) versus orchestrated variations (+0.5 and −0.5 from the framing level is at least one order of magnitude higher for detection).

Figure 11:
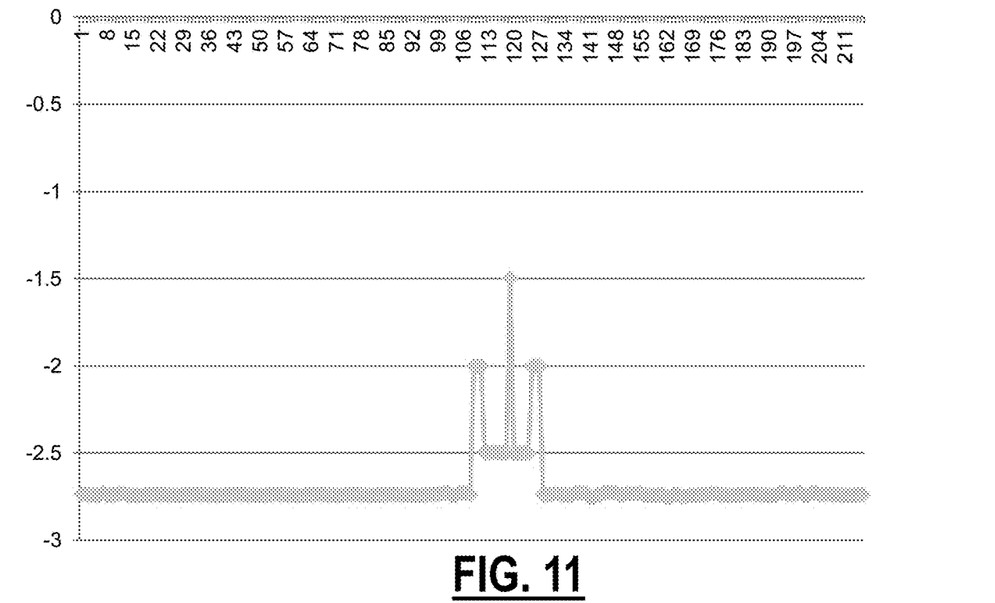
Figure 12:
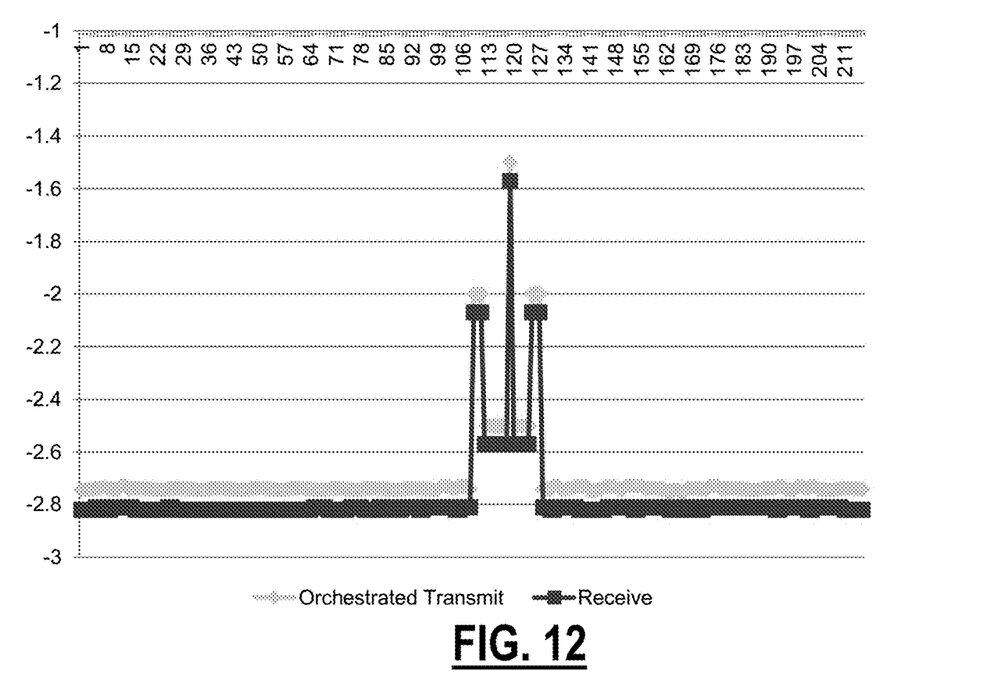

FIG. 11 illustrates the TX power orchestrated by the adjacency detection process 350 over the same 216 periods, to encode 020 in two dimensions. FIG. 12 illustrates the RX power overlaid on the TX power over the same 216 periods. Of course, the TX and RX power levels will be different due to propagation, but will match the pattern.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An adjacency detection method configured to detect physical interconnection between two devices in a network, the adjacency detection method comprising:
   obtaining data associated with the network from one or more controllers;
   for a given port on a device in the network to detect a corresponding port on another device physically connected thereto, causing orchestration of changes in performance monitoring data for the given port over a period of time, wherein the changes in performance monitoring data comprise modifying transmit power of the given port over the period of time to send a bit pattern that comprises data that identifies the given port, wherein the transmit power is modified while the port operates in-service and a specific power level is used for a 1 bit, a 0 bit, and a framing bit; and
   analyzing the data subsequent to the orchestration to detect the corresponding port, wherein the causing and analyzing are performed by a higher-layer application associated with the one or more controllers providing vendor independence and layer independence.

2. The adjacency detection method of claim 1, further comprising:
   updating a topology of the network based on the orchestration.

3. The adjacency detection method of claim 1, further comprising:
   verifying the corresponding port is connected to the given port by causing a second orchestration of changes in performance monitoring data for the corresponding port and analyzing the data subsequent to the second orchestration from the corresponding port.

4. The adjacency detection method of claim 1, wherein the analyzing comprises determining which port in the network exhibits Performance Monitoring (PM) data for receiving a signal similar to the data that identifies the given port.

5. The adjacency detection method of claim 1, further comprising:
   analyzing historical performance monitoring data and equipment specifications in the network to determine the changes in performance monitoring data.

6. The adjacency detection method of claim 1, wherein the one or more controllers comprise at least one Software Defined Networking (SDN) controller.

7. The adjacency detection method of claim 1, wherein the network comprises one or more layers and one or more different vendors for network elements included therein.

8. An adjacency detection system configured to detect physical interconnection between two devices in a network, the adjacency detection method comprising:
   a network interface communicatively coupled with one or more controllers associated with the network;
   a processor communicatively coupled to the network interface; and
   memory storing instructions that, when executed, cause the processor to
   obtain data associated with the network from the one or more controllers,
   for a given port on a device in the network to detect a corresponding port at another device physically connected thereto, cause orchestration of changes in performance monitoring data for the given port over a period of time, wherein the changes in performance monitoring data comprise a modification of transmit power of the given port over the period of time to send a bit pattern that comprises data that identifies the given port, wherein the transmit power is modified while the port operates in-service and a specific power level is used for a 1 bit, a 0 bit, and a framing bit, and
   analyze the data subsequent to the orchestration to detect the corresponding port, wherein the changes and analysis are performed by a higher-layer application associated with the one or more controllers providing vendor independence and layer independence.

9. The adjacency detection system of claim 8, wherein the memory storing instructions that, when executed, further cause the processor to
   update a topology of the network based on the orchestration.

10. The adjacency detection system of claim 8, wherein the memory storing instructions that, when executed, further cause the processor to
    verify the corresponding port is connected to the given port by causing a second orchestration of changes in performance monitoring data for the corresponding port and analyzing the data subsequent to the second orchestration from the corresponding port.

11. The adjacency detection system of claim 8, wherein the memory storing instructions that, when executed, further cause the processor to determine which port in the network exhibits Performance Monitoring (PM) data for receiving a signal similar to the data that identifies the given port.

12. The adjacency detection system of claim 8, wherein the memory storing instructions that, when executed, further cause the processor to
    analyze historical performance monitoring data and equipment specifications in the network to determine the changes in performance monitoring data.

13. The adjacency detection system of claim 8, wherein the one or more controllers comprise at least one Software Defined Networking (SDN) controller.

14. The adjacency detection system of claim 8, wherein the network comprises one or more layers and one or more different vendors for network elements included therein.

15. The adjacency detection system of claim 8, wherein the adjacency detection system is a Software Defined Networking (SDN) application.

16. A multi-layer network, comprising:
    a plurality of network elements interconnected to one another at a plurality of layers;

one or more controllers communicatively coupled to the plurality of network elements; and a server communicatively coupled to the one or more controllers, wherein the server is configured to obtain data associated with the network from the one or more controllers and data sources, for a given port on a network element in the network to detect a corresponding port on another network element physically connected thereto, cause orchestration of changes in performance monitoring data for the given port over a period of time, wherein the changes in performance monitoring data comprise a modification of transmit power of the given port over the period of time to send a bit pattern that comprises data that identifies the given port, wherein the transmit power is modified while the port operates in-service and a specific power level is used for a 1 bit, a 0 bit, and a framing bit, and analyze the data subsequent to the orchestration to detect the corresponding port, wherein the changes and analysis are performed by a higher-layer application associated with the one or more controllers providing vendor independence and layer independence.

\* \* \* \* \*